United States Patent [19]

Streib

[11] Patent Number: 5,529,039
[45] Date of Patent: Jun. 25, 1996

[54] METHOD AND ARRANGEMENT FOR CONTROLLING AN ADJUSTING DEVICE OF A DRIVE UNIT OF A MOTOR VEHICLE

[75] Inventor: Martin Streib, Vaihingen, Germany

[73] Assignee: Robert Bosch GmbH, Stuttgart, Germany

[21] Appl. No.: 404,736

[22] Filed: Mar. 15, 1995

[30] Foreign Application Priority Data

Apr. 2, 1994 [DE] Germany ................. 44 11 531.8

[51] Int. Cl.$^6$ ........................................... F02D 9/00
[52] U.S. Cl. ................................................ 123/399
[58] Field of Search ........................ 123/399, 403, 123/395, 361

[56] References Cited

U.S. PATENT DOCUMENTS

| | | | |
|---|---|---|---|
| 4,519,360 | 5/1985 | Murakami | 123/399 |
| 4,941,444 | 7/1990 | Fujita | 123/399 |
| 4,976,239 | 12/1990 | Hosaka | 123/399 |
| 4,987,872 | 1/1991 | Geselle et al. | 123/396 |
| 5,088,461 | 2/1992 | Ohashi et al. | 123/399 |
| 5,167,212 | 12/1992 | Peter et al. | 123/399 |
| 5,320,076 | 6/1994 | Reppich et al. | 123/399 |
| 5,383,431 | 1/1995 | Nishimura et al. | 123/399 |
| 5,408,899 | 4/1995 | Stewart | 123/399 |
| 5,429,092 | 7/1995 | Kamei | 123/399 |
| 5,445,126 | 8/1995 | Graves | 123/399 |

Primary Examiner—David A. Okonsky
Attorney, Agent, or Firm—Walter Ottesen

[57] ABSTRACT

The invention is directed to a method and an arrangement for controlling an adjusting device of a drive unit in a motor vehicle. When the ignition is switched on, the value then present for the driver command is interpreted as an idle command independently of its absolute magnitude.

9 Claims, 3 Drawing Sheets

METHOD AND ARRANGEMENT FOR CONTROLLING AN ADJUSTING DEVICE OF A DRIVE UNIT OF A MOTOR VEHICLE

BACKGROUND OF THE INVENTION

A method and an arrangement for controlling an adjusting device of a drive unit of a motor vehicle is disclosed in U.S. Pat. No. 4,987,872. In this patent, an electronic engine control for a motor vehicle is disclosed wherein an adjusting device, the throttle flap of an internal combustion engine, is adjusted in dependence upon the command of the driver. A measuring device is connected to an accelerator pedal of the motor vehicle and detects the driver command based on the position of the accelerator pedal. The electrical control of the adjusting device accelerates the vehicle when the accelerator pedal is actuated out of its rest position. For this reason, care is taken in the known arrangement that no unwanted operating states occur when the accelerator pedal is jammed or when there is twisting between accelerator pedal and measuring device. This is realized in that the power of the engine is reduced when the actuation of the brake is detected and the accelerator pedal is away from its rest position.

In the known procedure, the above-mentioned unwanted operating state is only detected during operation. The driver must furthermore actuate the brakes in this operating state.

SUMMARY OF THE INVENTION

In view of the above, it is an object of the invention to provide measures which will effectively prevent an unwanted operating situation caused by twisting between the measuring device and the accelerator pedal or a jamming of the accelerator pedal already at the start of an operating cycle.

The method of the invention is for controlling an adjusting device of a drive unit in a motor vehicle. The drive unit has an ignition which can be switched on and off. The method includes the steps of: actuating the adjusting device in response to a driver command for controlling the power of the drive unit; detecting a first value of a variable representing the driver command when the ignition of the drive unit is switched on; and, utilizing the first value as an idle power command of the driver.

In accordance with a further aspect of the invention, measures are provided which achieve a continuous comfortable emergency driving capability even when the accelerator pedal is jammed or when there is twisting between the measuring device and the accelerator pedal. The accelerator pedal can, for example, become jammed when it is depressed and so cannot return to its rest position.

The method and arrangement of the invention effectively prevent an unwanted operating situation caused by a twisting of measuring device and accelerator pedal or caused by a jammed accelerator pedal and ensures a continuous, comfortable emergency mode of operation. The above-mentioned twisting can include a bending or breakage of the mechanical connection between the accelerator pedal and the measuring device for measuring the position of the accelerator pedal. The measuring device can, for example, be a potentiometer.

It is especially advantageous that an existing twisting or an existing jamming of the pedal is detected already when the operating cycle starts with the "Ignition ON" and suitable countermeasures are provided for preventing an unwanted operating state.

It is especially advantageous that this takes place without additional intervention by the driver.

A further significant advantage is that a continuous control of the power of the drive unit by the driver is possible notwithstanding measuring devices which are out of alignment or a jammed pedal. The drivability of the vehicle is thereby ensured even in this situation.

It is also advantageous that a loosening of the jam or a diminishing misalignment is detected also during driving operation in the same manner as an unwanted recognition of a twisting or jamming and can be taken into account for the control of the drive unit.

It is advantageous that a misalignment or jamming, which occurs during driving operation, is detected and corresponding measures are initiated.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
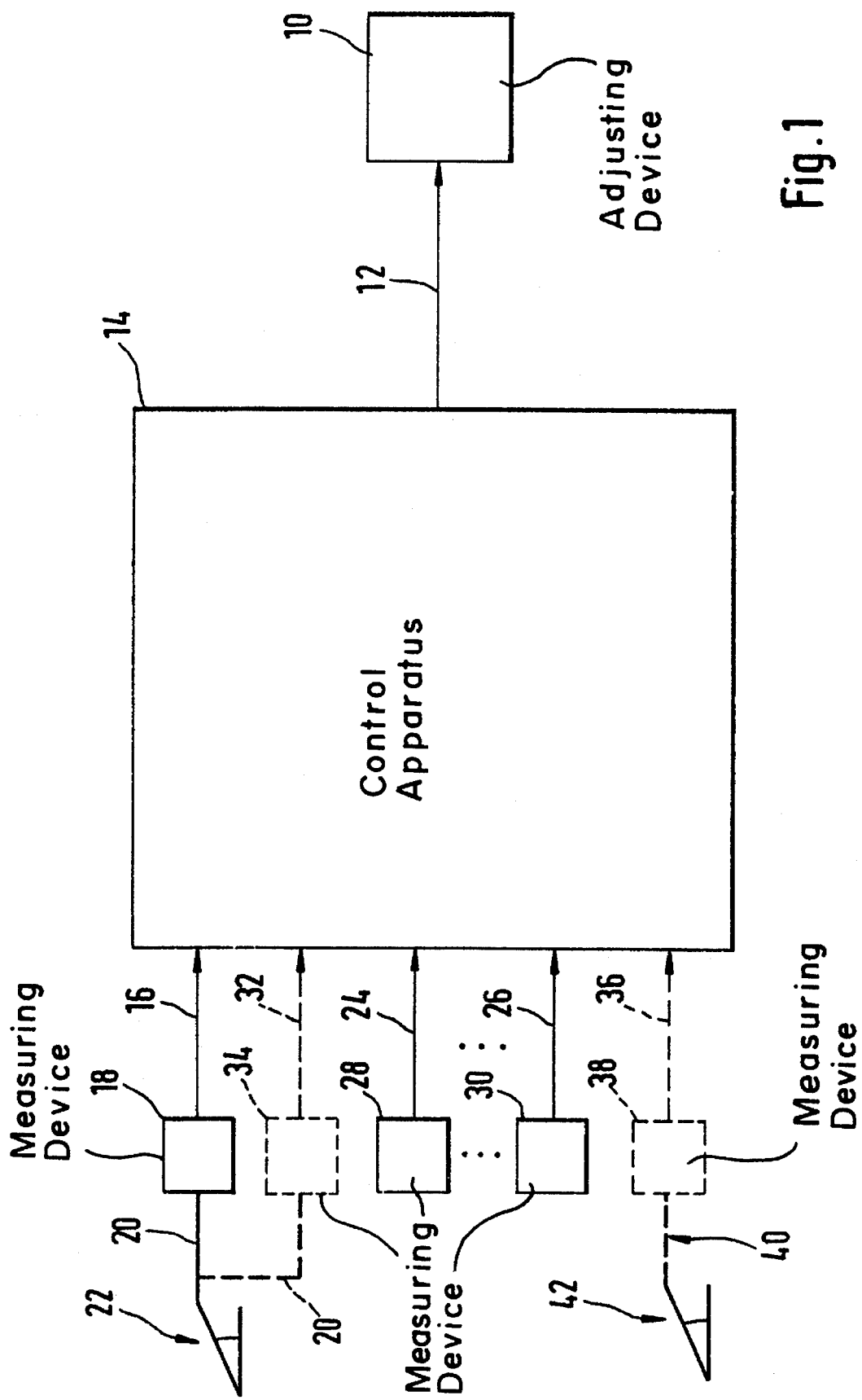
FIG. 1 is an overview block circuit diagram of a control arrangement for a drive unit.

FIG. 1 shows an overview block circuit diagram of an exemplary embodiment of the control arrangement for a drive unit wherein the method according to the invention is applied. Reference numeral 10 identifies an adjusting device which is actuated via a line 12 from a control apparatus 14. The adjusting device 10 is an electrically-actuated throttle flap in the preferred embodiment of the invention. In other preferred embodiments, the adjusting device 10 can be an adjusting device for influencing the metering of fuel to an engine such as a diesel engine.

The control apparatus 14 includes at least one computer element and a memory element. An input line 16 from a measuring device 18 is connected to the control apparatus 14. The measuring device 18 is connected via a mechanical connection 20 to an operator-actuated element 22 which is preferably an accelerator pedal. Furthermore, input lines 24 to 26 connect measuring devices 28 to 30, respectively, to the control apparatus 14 and supply additional operating variables of the drive unit and/or of the vehicle to the control apparatus.

In an advantageous embodiment, the input line 32 from a measuring device 34 is also connected to the control apparatus 14. The measuring device 34 is at least partially redundant with respect to measuring device 18 and is likewise connected via the mechanical connection 20 to the operator-actuated element 22. Furthermore, and in an advantageous embodiment, the input line 36 is connected to the control apparatus 14. The input line 36 comes from a measuring device 38 which is connected via a mechanical connection 40 to a further operator-actuated element 42, preferably a brake pedal.

The control unit 14 controls the power of the drive unit by adjusting the adjusting device 10 at least in dependence upon the command of the driver as detected by the measuring device 18. A desired value for setting the adjusting device 10 is formed in the control apparatus 14 on the basis of the position value of the operator-actuated element 22 and, if required, further operating variables such as engine rpm, engine temperature, gear position, et cetera. The position value of the operator-actuated element 22 is detected via the line 16. The desired value for setting the adjusting device is, for example, in the context of an electronic accelerator pedal, a position desired value for the position of the throttle flap or an air-quantity or air-mass desired value; whereas, in the context of an electronic diesel control, the desired value is a value for the quantity of fuel to be metered.

For engine control systems which adjust the engine power on the basis of at least the driver command, an unwanted operating situation can develop when the mechanical connection 20 between the measuring device 18 and the operator-actuated element 20 becomes twisted, that is, becomes misaligned or when the operator-actuated element 22 is itself mechanically prevented from returning to its rest position, that is, when this element 22 becomes jammed. The measuring device 18 then indicates an actuation or displacement of the accelerator pedal which is greater than the actual actuation thereof. For example, in this case, the measuring device can show an actuation of the accelerator pedal greater than the latter is in its rest position. The result of this situation is that the control apparatus 14 determines a power command opposite to the actual command of the driver and the adjusting device 10 is correspondingly controlled. The increased power resulting therefrom is in opposition to the command of the driver and can thereby bring about unwanted operating situations.

In order to prevent this, and according to the invention, the signal value of the measuring device 18 is detected (rest position value) when the ignition is switched on and is compared to a previously stored value (base value) in the control apparatus 14. The signal value of the measuring device 18 is the position of the operator-actuated element 22 which is then present. The base value defines the rest position or the region of the rest position of the operator-actuated element 22 or a base idle command value. If the detected value represents a greater position of the operator-actuated element than the stored value, then the detected value is interpreted as representing the rest position of the operator-actuated element. In this way, the rest position of the operator-actuated element 22 and therefore the idle power command of the driver is pregiven in a defined manner when there is a misalignment of the measuring device 18 or when there is a jamming of the pedal. The offset, which is formed from the difference between the stored and detected values, is taken into account over the total operating range for the control of the adjusting device 10. That is, the offset is taken into account over the entire range of position of the accelerator pedal. In this way, the maximum power of the drive unit is no longer reached but the operating safety and availability of the motor vehicle itself are ensured even when the measuring device is misaligned and the pedal is jammed.

The detection and, if necessary, the storage of the accelerator pedal position takes place when the ignition is switched on. This means that the then present position value is processed, at the latest, after the following takes place: turning the ignition key and the initialization which follows, the self-test of the control unit which then follows and additional procedures associated with the start of the drive unit. The latest time point is when the engine rpm exceeds a threshold which identifies the end of the start phase.

Figure 2:
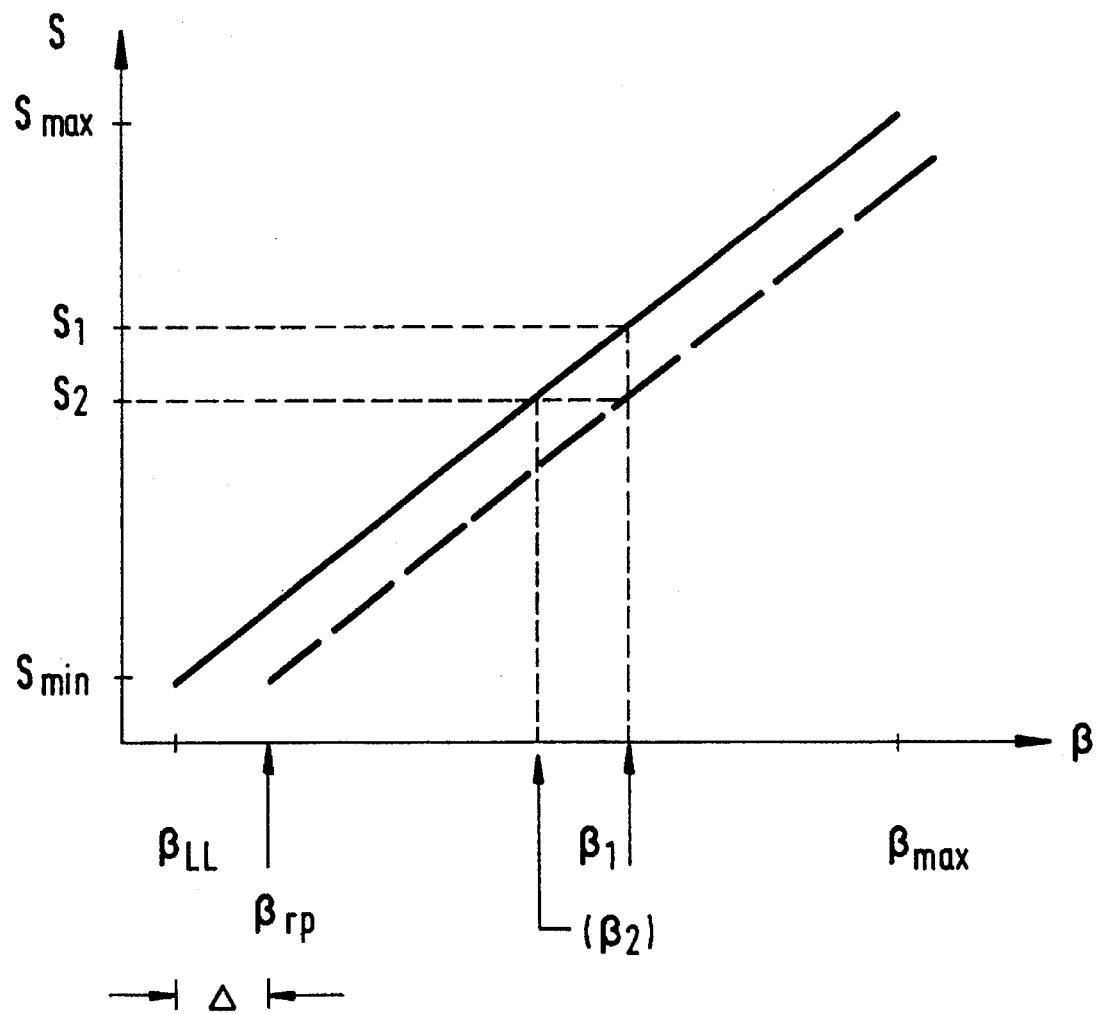
FIG. 2 is a graph showing the operation of a method and arrangement of the invention; and, FIG. 3 shows, with the aid of a flowchart, how the method of the invention is realized in a computer program.

In the diagram of FIG. 2, the desired value S is plotted as a function of the position $\beta$ of the operator-actuated element.

The operator-actuated element can be displaced by the driver between a minimum value $\beta LL$ and its maximum value $\beta max$. This displacement is based on linear relationships and causes a corresponding desired value change from a minimum value Smin to a maximum value Smax. This can be shown in several embodiments by a linear characteristic line (solid line). If the measuring device 18 is misaligned or the operator-actuated element is prevented from returning, then, at the start of the operating cycle, the then present position value of the accelerator pedal is detected and stored as a rest position value $\beta rp$ when the stored value $\beta LL$ is exceeded. An offset value $\Delta$ is formed between the stored idle position $\beta LL$ and the detected rest position $\beta rp$. The offset value is subtracted, in running operation, from all position values $\beta$ when forming the desired value S. If the driver, for example, displaces the pedal to the value $\beta 1$, this would result in a desired value S1 during normal operation. As a consequence of the jamming, the value $\Delta$ is subtracted from the position value $\beta 1$ which is $\beta 2$ shown in FIG. 2 so that a desired value S2 results which is less than the desired value S1. In other words, the characteristic line shown in FIG. 2 is shifted to the right by the value $\Delta$ (shown by a broken line). The minimum desired value Smin is assigned to the detected rest position $\beta rp$.

If the driver actuates the accelerator pedal already at the time point of switching on the ignition, an offset value would then always erroneously be considered. The consequence of this would be that the driver would no longer have the full power of the drive unit available even with the accelerator pedal fully depressed without a jamming or twisting being present. For this reason, and according to a further feature, the method and apparatus of the invention cancel the measure explained above when, during driving operation, a position value is detected which corresponds to the normal idle value $\beta LL$ or lies in the region thereof. The offset is then cancelled and the control is carried out in accordance with normal operation. In another embodiment, an offset value which is formed is reduced when a position value is determined which is less than the stored value $\beta rp$. Then, the value present can be stored as a new value $\beta rp$.

It is especially advantageous to secure the cancellation of the offset in that the cancellation can only then be carried out when a signal, which is redundant to the accelerator pedal position value, signals correspondence to the idle value $\beta LL$ or when the brakes are actuated simultaneously with this idle value.

An advantageous further feature of the method of the invention makes possible the detection of the twisting or of the jamming of the pedal during travel. This is achieved in that a check is made, when the brake is depressed, as to whether the idle value of the position value is indicated. If this is not the case, then the instantaneous value can be stored as rest position $\beta rp$ and the above-described measures can be initiated. Here too, the measure can be cancelled when a normal idle position value or a value less than the stored value is detected.

Figure 3:
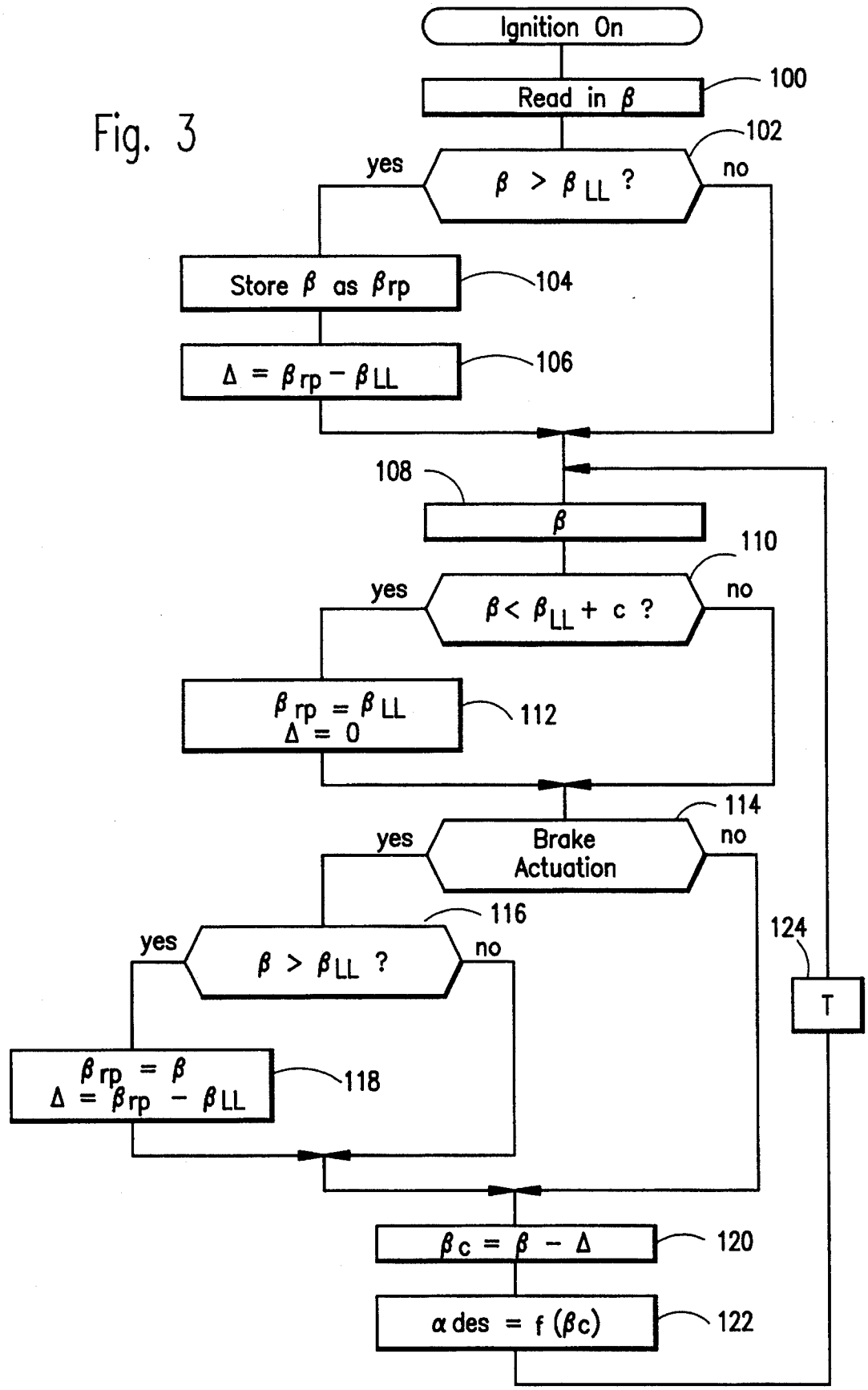

FIG. 3 shows a flowchart of the method of the invention. This subprogram is initiated with the actuation of the ignition switch (ignition on), if required, after initialization steps and start procedures whereupon, in the first step 100, the accelerator pedal position value $\beta$ is read in. In the next step 102, a check is made as to whether the read-in value $\beta$ is greater than the stored idle value $\beta LL$ or lies outside of the value range thereof. If this is the case, then, and in accordance with step 104, the value $\beta$ is stored as the rest position value $\beta rp$ and the difference $\Delta$ is formed in the next step 106. The difference $\Delta$ is the offset value between $\beta rp$ and $\beta LL$.

The idle value (βLL) is then either stored initially or is learned in course of many operating cycles.

After step 106, in the same manner as with a negative answer in step 102, when a read-in value β is equal to or lies in the direct vicinity of the idle value βLL, the position value β is again read in accordance with step 108 and, in accordance with step 110, an inquiry is made as to whether this position value lies in the region of the idle value or is equal to this idle value. If this is the case, then, in accordance with step 112, the rest position value βrp is again set to the stored value βLL and the offset value is reduced to zero. This program segment ensures the cancellation of the offset value during travel operation when there is an unwanted offset value determined or when there is a release of the jamming or of the twisting. The cancellation of the offset value in accordance with step 112, can, as mentioned above, be provided in advantageous embodiments in dependence upon redundant position signals of the accelerator pedal, a redundant position transducer or a switch element or, in dependence upon an actuation of the brakes detected in the inquiry step 110.

After step 112 or after inquiry step 110 when there is a negative answer, a check is made in step 114 as to whether an actuation of the brakes is present. If this is the case, then, in accordance with step 116, a check is made as to whether the position value β is greater than the stored value βLL or lies outside of its value range. If this is the case, then, in accordance with step 118, the position value β is set as the rest position value βrp and the offset value Δ is formed. After step 118 (or after a negative answer in step 116 or step 114), the method continues with step 120 wherein the corrected position value βc is formed by the difference of the detected value β and the offset value Δ. In the next inquiry step 122, the desired value S is determined on the basis of the corrected position value βc. The subprogram with step 108 is repeated after a time symbolized by the step 124.

The subprogram of FIG. 3 therefore ensures that, when the ignition is switched on, the then present position value is stored as a rest position value and, if required, the offset value is formed. The offset value is taken into account in accordance with steps 120 and 122 for the control of the position element and therefore for the control of the engine power. If this start position changes during the operating cycle, then steps 108 to 112 ensure that the described measure is cancelled when a jamming or twisting is not present or when jamming or twisting has been released. If the idle value is detected when the ignition is switched on and a twisting or jamming occurs during travel, then steps 114 and 118 ensure that this twisting or jamming is detected also during travel and the measures described above are initiated to ensure operational safety and availability of the vehicle.

It is understood that the foregoing description is that of the preferred embodiments of the invention and that various changes and modifications may be made thereto without departing from the spirit and scope of the invention as defined in the appended claims.

What is claimed is:

1. A method of controlling an adjusting device of a drive unit of a motor vehicle, the drive unit being switchable between on and off, the motor vehicle including an operator-actuated element which is actuated by a drive of the motor vehicle to input a drive command (β) for controlling said adjusting device, the method comprising the steps of:

detecting a first value ($\beta_{rp}$) of a variable corresponding to a first driver command (β) when said drive unit is switched on and assuming said first value ($\beta_{rp}$) to correspond to an idle driver command ($\beta_{LL}$);

detecting a second value of said variable corresponding to a second driver command (β) during running operation of said motor vehicle after said switch on for controlling said adjusting device; and, setting said adjusting device in dependence upon said detected second value of said driver command (β) and said first value ($\beta_{rp}$) during said running operation of said motor vehicle.

2. The method of claim 1, wherein said operator-actuated element is operatively connected to said adjusting device; and, wherein the method comprises the further steps of:

providing a basic idle value of said variable and storing the same in memory means and said base idle value representing a base idle command;

storing said first value ($\beta_{rp}$) in said memory means;

forming an offset value (Δ) from the difference of said first value and said basic idle value; and, subtracting said offset value (Δ) from said second value in running operation of said vehicle to form a desired value for the adjustment of said adjusting device.

3. The method of claim 2, wherein said operator-actuated element is an accelerator pedal of the motor vehicle and said variable is the varying position of said accelerator pedal.

4. The method of claim 2, further comprising the step of assuming said basic idle value as said first value when said variable reaches said basic idle value.

5. The method of claim 4, wherein said variable changes in dependence upon the position of said operator-actuated element; and, wherein the method further comprises the steps of:

monitoring said variable as the brakes are actuated and noting the new value of said variable;

assuming the value of said variable to be said test-position value when said variable becomes greater than said stored basic idle value at the time that the brakes of the vehicle are actuated; and, calculating said offset value on the basis of the new assumed rest-position value.

6. The method of claim 2, further comprising the step of cancelling the use of said first value when the actual value of said variable is in the region of said stored basic idle value.

7. The method of claim 2, wherein said variable is a first variable; and, further comprises the steps of:

providing a second variable at least partially redundant to said first variable; and, cancelling the use of said first value when said second variable assumes a value in the region of said stored basic idle value or when the brakes of the motor vehicle are actuated.

8. The method of claim 2, further comprising the step of reducing the available power of said drive unit when said first value is an increased idle value.

9. An arrangement for controlling an adjusting device of a drive unit of a motor vehicle, the arrangement comprising:

control means for controlling said adjusting device at least on the basis of a driver command (β) inputted by the driver;

said control means including means for switching said drive unit on and off;

detecting means for detecting a value ($\beta_{rp}$) of said driver command when said drive unit is switched on and said control means including means for assuming said value ($\beta_{rp}$) as an idle command ($\beta_{LL}$) of the driver;

said control means including means for detecting said driver command (β) during running operation of the vehicle after said switch on for controlling said adjusting device; and, said control means further including means for setting said adjusting device in dependence upon said driver command (β) and said value ($β_{rp}$) during said operation of said motor vehicle.

* * * * *

UNITED STATES PATENT AND TRADEMARK OFFICE
CERTIFICATE OF CORRECTION

PATENT NO. : 5,529,039

DATED : June 25, 1996

INVENTOR(S) : Martin Streib

It is certified that error appears in the above-identified patent and that said Letters Patent is hereby corrected as shown below:

In column 5, line 63: delete "drive" and substitute -- driver -- therefor.

Signed and Sealed this

Twenty-second Day of July, 1997

Attest:

BRUCE LEHMAN

*Attesting Officer*     *Commissioner of Patents and Trademarks*